(12) United States Patent
Kobayashi et al.

(10) Patent No.: US 8,507,875 B2
(45) Date of Patent: Aug. 13, 2013

(54) ULTRAVIOLET IRRADIATION APPARATUS

(75) Inventors: Shinji Kobayashi, Kanagawa-ken (JP);
Norimitsu Abe, Kanagawa-ken (JP);
Akihiko Shirota, Tokyo (JP); Naoto Yoshizawa, Tokyo (JP); Takahiro Soma, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/421,649

(22) Filed: Mar. 15, 2012

(65) Prior Publication Data

US 2012/0235059 A1 Sep. 20, 2012

(30) Foreign Application Priority Data

Mar. 17, 2011 (JP) ................. P2011-059824

(51) Int. Cl.
*C02F 1/32* (2006.01)
(52) U.S. Cl.
USPC ........ 250/436; 250/428; 250/432 R; 250/435; 250/504 R; 361/600; 361/601; 361/674; 336/90; 336/92; 315/246; 315/276; 210/198.1; 422/24
(58) Field of Classification Search
USPC ................... 250/428, 432 R, 435, 436, 504 R; 361/600, 601, 674; 336/90, 92; 315/246, 315/276; 210/198.1; 174/DIG. 2
See application file for complete search history.

(56) References Cited

U.S. PATENT DOCUMENTS

| | | | | | |
|---|---|---|---|---|---|
| 3,550,782 | A | * | 12/1970 | Veloz | 210/192 |
| 3,851,225 | A | * | 11/1974 | Luchetta | 361/674 |
| 6,094,124 | A | * | 7/2000 | Lee | 336/210 |
| 6,258,265 | B1 | * | 7/2001 | Jones | 210/202 |
| 6,479,947 | B1 | * | 11/2002 | Newsome | 315/277 |
| 7,888,657 | B1 | * | 2/2011 | Zadro | 250/455.11 |
| 2006/0066191 | A1 | * | 3/2006 | Bschorer et al. | 313/110 |

FOREIGN PATENT DOCUMENTS

JP 2004-223502 8/2004

* cited by examiner

*Primary Examiner* — Michael Logie
(74) *Attorney, Agent, or Firm* — Knobbe, Martens, Olson & Bear, LLC

(57) ABSTRACT

A ultraviolet irradiation apparatus includes: an ultraviolet-irradiation water tank; a protection pipe provided in the ultraviolet-irradiation water tank; an ultraviolet lamp provided in the protection pipe to be lit up with high-frequency discharge at a frequency of 10 kHz to 10 MHz, inclusive; protection covers respectively provided on the two ends of the ultraviolet-irradiation water tank; an electronic ballast provided in one of the protection covers; and a feeder wire electrically connecting the ultraviolet lamp to the electronic ballast. Each of the ultraviolet-irradiation water tank and the protection covers is made of a conductive material with a specific conductivity and a relative magnetic permittivity whose product is equal to or larger than 1, and has a thickness at least three times as large as a skin depth at a frequency of a high-frequency current that flows through the ultraviolet lamp.

11 Claims, 9 Drawing Sheets

|  | Specific conductivity X | Relative magnetic permeability Y | X · Y |
|---|---|---|---|
| Vacuum | — | 1 ((standard)) | — |
| Silver | 1.06 | 0.9998 | 1.05998 |
| Copper | 1 (standard) | 0.99991 | 1.00 |
| Gold | 0.78 | 1 | 0.78 |
| Aluminum | 0.63 | 1.00002 | 0.63 |
| Nickel | 0.23 | 600 | 138 |
| Soft iron | 0.17 | 2000 | 340 |
| Iron | 0.17 | 5000 | 850 |

FIG. 9

ULTRAVIOLET IRRADIATION APPARATUS

CROSS REFERENCE TO RELATED APPLICATIONS

This application is based on and claims priority to Japanese Patent Application No. 2011-059824 filed on Mar. 17, 2011, the entire contents of which are incorporated by reference herein.

FIELD

Embodiments of the invention relate to an ultraviolet irradiation apparatus.

BACKGROUND

Ultraviolet treatment is used for disinfection and sterilization in water supply and sewerage systems (see JP, P2004-223502A).

Ultraviolet lamps are used as the ultraviolet light sources of ultraviolet irradiation apparatuses, and are lit up by using the high-frequency discharge. When the frequency of the high-frequency discharge in an ultraviolet irradiation apparatus is 10 MHz or higher, electric field is dominant in radio-wave leakage from the ultraviolet lamp and the feeder wires in the ultraviolet irradiation apparatus. In this case, it is possible to prevent such radio-wave leakage almost completely by simply shielding the ultraviolet lamp and the feeder wires in the ultraviolet irradiation apparatus with metal. However, in a case where the ultraviolet lamps are lit up by using high-frequency discharge with frequencies of 10 kHz to 10 MHz, inclusive, the magnetic field may leak from the ultraviolet lamp and the feeder wires in the ultraviolet irradiation apparatus, and the magnetic field thus leaked out of the ultraviolet irradiation apparatus may possibly lead to malfunctions of other apparatuses.

BRIEF DESCRIPTION OF THE DRAWINGS

FIG. 9 is a table showing the specific conductivities X, and the relative magnetic permittivities Y of some commonly used metals, together with the products X·Y.

DETAILED DESCRIPTION

The embodiments provides a ultraviolet irradiation apparatus which includes: an ultraviolet-irradiation water tank having a water-inlet port for water to be treated and a water-outlet port for treated water; a protection pipe provided in the ultraviolet-irradiation water tank, and penetrating two ends of the ultraviolet-irradiation water tank; an ultraviolet lamp provided in the protection pipe, and configured to emit ultraviolet rays onto the water to be treated by being lit up with high-frequency discharge at a frequency of 10 kHz to 10 MHz, inclusive; protection covers respectively provided on the two ends of the ultraviolet-irradiation water tank and configured to block the ultraviolet rays and electromagnetic waves; an electronic ballast provided in one of the protection covers; and a feeder wire provided in the ultraviolet-irradiation water tank and the protection covers and electrically connecting the ultraviolet lamp to the electronic ballast. Each of the ultraviolet-irradiation water tank and the protection covers is made of a conductive material with a specific conductivity and a relative magnetic permittivity whose product is equal to or larger than 1, and has a thickness at least three times as large as a skin depth at a frequency of a high-frequency current that flows through the ultraviolet lamp.

Figure 1:
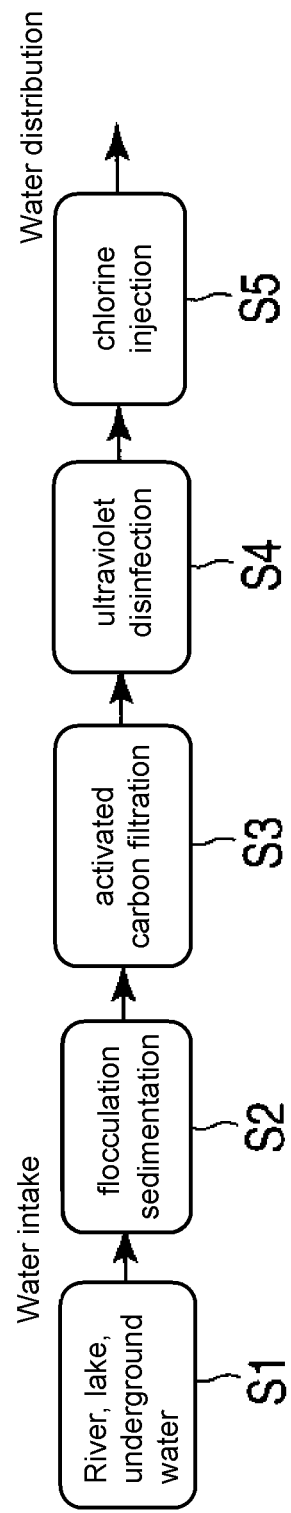
FIG. 1 is a flowchart illustrating an overview of a series of processes in a water-purification treatment system.

Description will be provided of ultraviolet irradiation apparatuses according to various embodiments of the invention. The embodiments are not limited to the description given below. Firstly, an overview of a series of processes in a water-purification treatment system will be described by referring to FIG. 1. Raw water is taken in from a river, a lake, or an underground water (Step S1). Subsequently, the raw water thus taken in is introduced into a flocculation-sedimentation tank, where a flocculant is added to the raw water to cause tiny particles to stick together and settle down (Step S2). Subsequently, the supernatant water in the flocculation-sedimentation tank is sent to an activated-carbon filtration tank to filter out foreign objects (Step S3). Subsequently, the filtered water is sent to an ultraviolet irradiation apparatus, where the filtered water is irradiated with ultraviolet rays (Step S4). Subsequently, the water after the ultraviolet disinfection treatment is sent to a chlorination tank, where chlorine is introduced into the water after the ultraviolet disinfection treatment (Step S5). After Step S5, the water thus treated is delivered to private households and to business facilities. The ultraviolet irradiation apparatus according to an embodiment of the invention is used at Step S4 for sterilization, sanitization, and inactivation in a water supply system. The ultraviolet irradiation apparatus according to an embodiment is also used for sterilization, sanitization, and inactivation in a sewerage system.

In an ultraviolet irradiation apparatus according to an embodiment, both an ultraviolet-irradiation water tank and protection covers are made of conductive materials each with a specific conductivity and a relative magnetic permittivity whose product is equal to or larger than one. In addition, each of the ultraviolet-irradiation water tank and the protection covers has a thickness at least three times as large as the skin depth at the frequency of the high-frequency current flowing through the ultraviolet lamp. Some examples of the conductive materials are metals, conductive resins, conductive ferrites, and the like. Stainless steels (e.g., SUS316) are examples of such metals. Resins mixed with metal powders, resins whose surfaces are coated with meal films are some examples of such conductive resins FIG. 9 shows the specific conductivity X, and the relative magnetic permittivities Y of some commonly used metals, together with the products X·Y.

The current density of a high-frequency current that flows through a conductor is higher in the surface of the conductor than in a place remote from the surface due to the skin effect. The current density J is expressed as follows in terms of the depth δ.

$$J = e^{-b/d}$$

where d is a skin depth (μm), which is a depth where the current is almost equal to 1/e (=0.37, approximately) of the surface current. The skin depth d is calculated by the following formula.

$$d = (5.03 \times 10^8) \times (\rho/\mu_r \cdot f)^{1/2}$$
$$= (6.609 \times 10^{-3})/(f/\sigma_r)^{1/2}$$

where $\rho$ is the resistivity, $\mu$ is the relative magnetic permittivity, f is the frequency, and $\sigma_r$ is the specific conductivity.

Some specific embodiments of the invention will be described in detail below.

Embodiment 1

Figure 2:
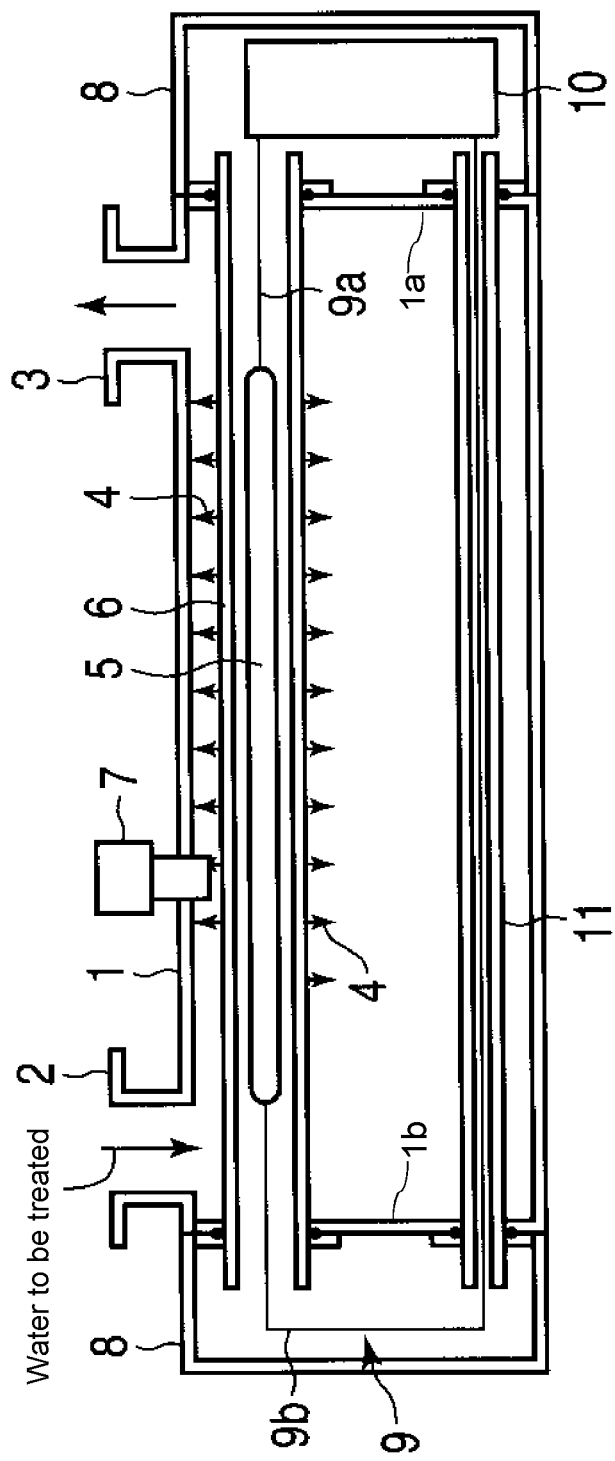
FIG. 2 is a sectional view of an ultraviolet irradiation apparatus according to an embodiment 1.

A ultraviolet irradiation apparatus according to the embodiment 1 will be described below with reference to FIG. 2. A tubular-shaped ultraviolet-irradiation water tank 1 has a water inlet port 2 for water to be treated and a water outlet port 3 for treated water. The ultraviolet-irradiation water tank 1 is made of a conductive material with a specific conductivity and a relative magnetic permittivity whose product is equal to or larger than 1. The thickness of the ultraviolet-irradiation water tank 1 is at least three times as large as the skin depth at the frequency of the high-frequency current. The ultraviolet-irradiation water tank 1 is made, for example, of a stainless steel (SUS304, SUS316, SUS316L, or the like). A tubular-shaped protection pipe 6 is provided in the ultraviolet-irradiation water tank 1. The protection pipe 6 penetrates two end portions 1a and 1b of the ultraviolet-irradiation water tank 1. The protection pipe 6 is, for example, a silica-glass pipe. A ultraviolet lamp 5 is provided in the protection pipe 6. The ultraviolet lamp 5 emits ultraviolet rays 4 onto the water to be treated that is in the ultraviolet-irradiation water tank 1. The ultraviolet lamp 5 is lit up by using a high-frequency discharge with a frequency ranging from 10 kHz to 10 MHz, inclusive. The ultraviolet-irradiation water tank 1 has a monitor window 7. An unillustrated ultraviolet-ray monitor monitors the ultraviolet-ray irradiance by the ultraviolet lamp 5 through the monitor window 7.

Protection covers 8 to shield the ultraviolet rays and electromagnetic waves are provided respectively on both ends of the ultraviolet-irradiation water tank 1. The protection covers 8 are each made of a conductive material with a specific conductivity and a relative magnetic permittivity whose product is equal to or larger than 1. The thickness of the protection covers 8 is at least three times as large as the skin depth at the frequency of the high-frequency current that flows through the ultraviolet lamp 5. The protection covers 8 are each made, for example, of a stainless steel (SUS304, SUS316, SUS316L, or the like). In the first embodiment, the protection covers 8 are made of the same material as that of the ultraviolet-irradiation water tank 1. An electronic ballast 10 is provided inside of one of the protection covers 8. The electronic ballast 10 is electrically connected to the ultraviolet lamp 5 by means of a feeder wire 9. The feeder wire 9 is made, for example, of aluminum (Al). A tubular-shaped pipe 11 is provided in the ultraviolet-irradiation water tank 1. The pipe 11 penetrates the two end portions 1a and 1b of the ultraviolet-irradiation water tank 1, and is placed in parallel to the ultraviolet lamp 5. A first end portion of the protection pipe 6 and a first end portion of the pipe 11 are covered with one of the protection covers 8. A second end portion of the protection pipe 6 and a second end portion of the pipe 11 are covered with the other one of the protection covers 8.

The feeder wire 9 includes a first feeder wire 9a and a second feeder wire 9b. The first feeder wire 9a has a first end connected to one of the two terminals of the electronic ballast 10 and a second end connected to a first terminal of the ultraviolet lamp 5 within the protection pipe 6. The second feeder wire 9b has a first end connected to a second terminal of the ultraviolet lamp 5 within the protection pipe 6. The second feeder wire 9b stretches through the protection pipe 6, one of the protection cover 8, and the pipe 11 and has the other end connected to a second terminal of the electronic ballast 10. The first feeder wire 9a, the second feeder wire 9b, the ultraviolet lamp 5, and the electronic ballast 10 are connected to one another to form a loop. A portion of the second feeder wire 9b that passes through the pipe 11 is placed in parallel to the ultraviolet lamp 5. The feeder wire 9 is placed within the ultraviolet-irradiation water tank 1 and the protection covers 8 in the above-described way.

According to the embodiment 1, each of the ultraviolet-irradiation water tank 1 and the protection covers 8 is made of a conductive material with a specific conductivity and a relative magnetic permittivity whose product is equal to or larger than 1. The thickness each of the ultraviolet-irradiation water tank 1 and the protection covers 8 is at least three times as large as the skin depth at the frequency of the high-frequency current that flows through the ultraviolet lamp 5. Hence, the electromagnetic waves in the vicinity of the ultraviolet lamp 5 and from the feeder wire 9 can be prevented from leaking out of the ultraviolet irradiation apparatus, so that malfunctions of other apparatuses can be avoided.

Embodiment 2

Figure 3:
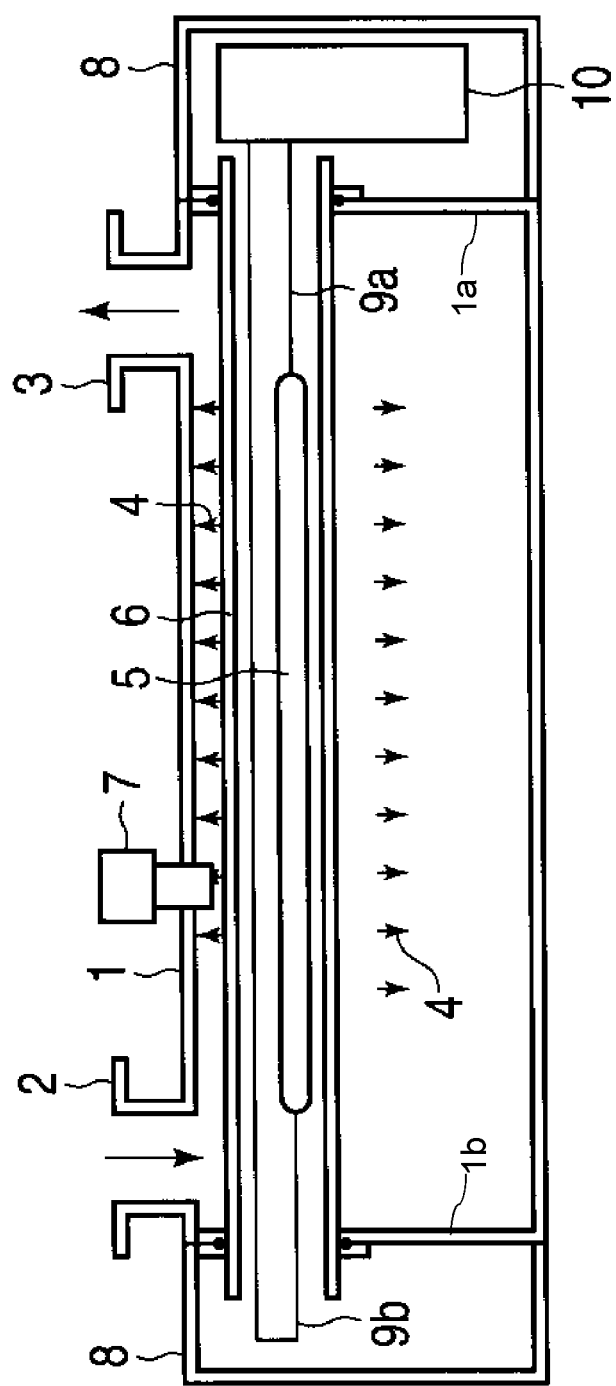
FIG. 3 is a sectional view of an ultraviolet irradiation apparatus according to an embodiment 2.
Figure 4:
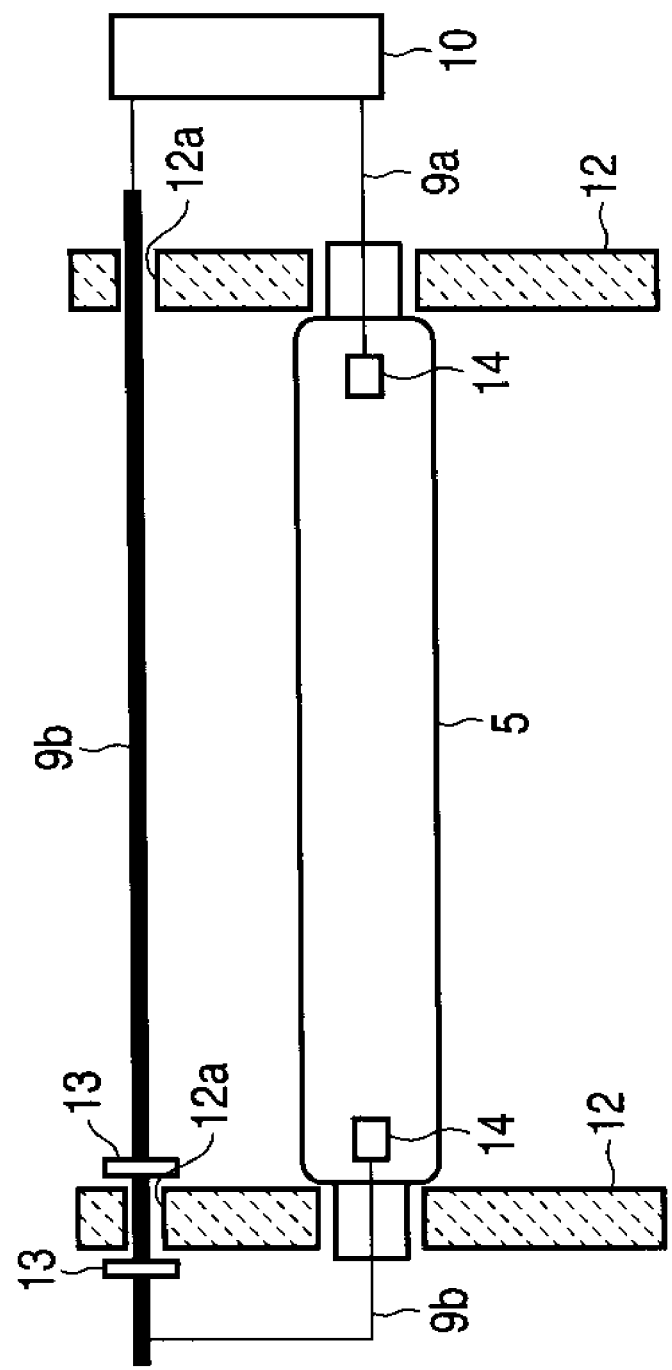
FIG. 4 is an enlarged view of a principal portion of the ultraviolet irradiation apparatus shown in FIG. 3.
Figure 5:
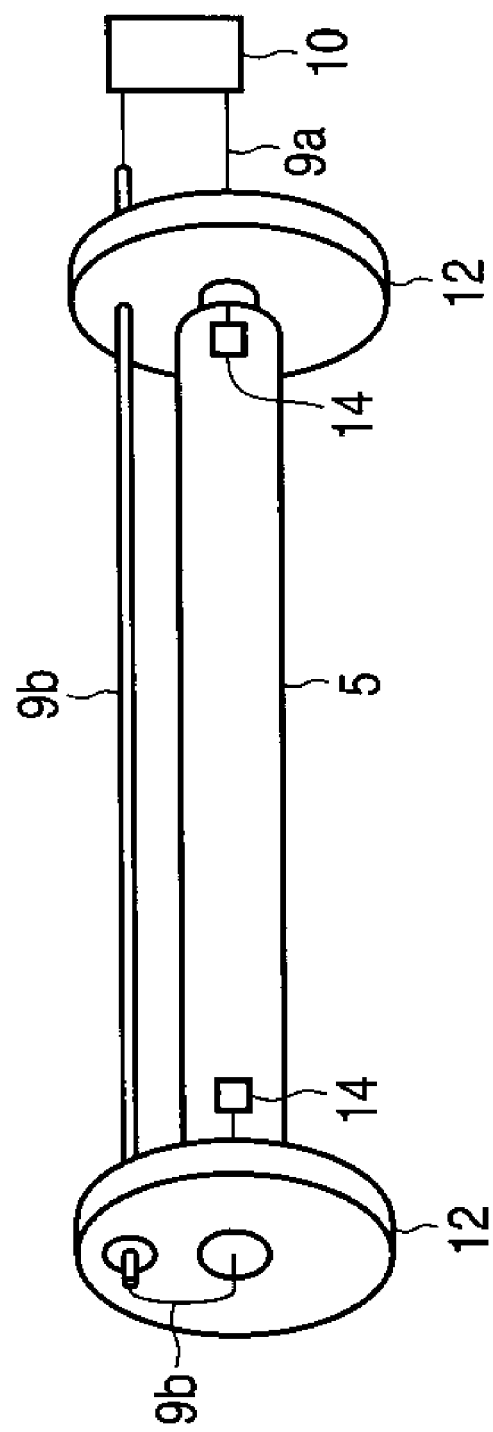
FIG. 5 is a schematic perspective view of FIG. 3.

A ultraviolet irradiation apparatus according to the embodiment 2 will be described with reference to FIGS. 3 to 5. FIG. 3 is a sectional view of the ultraviolet irradiation apparatus. FIG. 4 is an enlarged view of a principal portion of FIG. 3. FIG. 5 is a schematic perspective view of FIG. 4. Note that portions same as those in FIG. 2 are denoted by the same reference numerals used in FIG. 2, and the description thereof will be omitted.

As shown in FIG. 3, in the ultraviolet irradiation apparatus according to the embodiment 2, the feeder wires 9a and 9b are connected to the ultraviolet lamp 5 and to the electronic ballast 10 to form a loop within the protection pipe 6 and the protection covers 8. A portion of the second feeder wire 9b parallel to the ultraviolet lamp 5 is placed close to the ultraviolet lamp 5 within the protection pipe 6. As shown in FIGS. 4 and 5, the two ends of the ultraviolet lamp 5 are fixed to ceramics guide members 12 within the protection pipe 6. The second feeder wire 9b passes through through-holes 12a formed respectively in the guide members 12. The second feeder wire 9b is fixed to one of the two guide members 12 by means of fixing members 13. In the case shown in FIG. 4, the fixing members 13 are fixed to one of the guide members 12 that is farther from the electronic ballast 10. Note that members 14 shown in FIGS. 4 and 5 are electrodes of the ultraviolet lamp 5.

According to the embodiment 2, each of the ultraviolet-irradiation water tank 1 and the protection covers 8 is made of a conductive material with a specific conductivity and a relative magnetic permittivity whose product is equal to or larger than 1. The thickness of each the ultraviolet-irradiation water tank 1 and the protection covers 8 is at least three times as large as the skin depth at the frequency of the high-frequency current that flows through the ultraviolet lamp 5. Accordingly, like the ultraviolet irradiation apparatus according to the embodiment 1, the ultraviolet irradiation apparatus according to the embodiment 2 can prevent the electromagnetic waves in the vicinity of the ultraviolet lamp 5 and from the feeder wire 9 from leaking out of the ultraviolet irradiation apparatus, so that malfunctions of other apparatuses can be avoided.

As shown in FIG. 3, the ultraviolet lamp 5 and the feeder wires 9a and 9b, connected to the electronic ballast 10 together form a loop antenna in a case where the ultraviolet lamp 5 is lit up by using the high-frequency discharge. Hence, unnecessary electromagnetic field is more likely to be discharged out of the apparatus. In the embodiment 2, however, the parallel portion of the feeder wire 9b to the ultraviolet lamp 5 is placed close to the ultraviolet lamp 5 within the protection pipe 6. Hence, unnecessary electromagnetic field can be prevented from leaking out of the apparatus, so that malfunctions of other apparatuses can be avoided. In addition, one of the end portions of the second feeder wire 9b is fixed to one of the guide members 12 by means of the fixing members 13. The other end portion of the second feeder wire 9b is supported in such a manner that the other end portion can be a free end that passes through the through-hole 12a formed in the guide member 12. Hence, the second feeder wire 9b is supported by one of the guide members 12 and is fixed to the other one of the guide members 12. Accordingly, even if the second feeder wire 9b is heated by the radiation heat emitted from the ultraviolet lamp 5, and expands and is thermally deformed, the relative positions of the second feeder wire 9b and the ultraviolet lamp 5 can be maintained.

Embodiment 3

Figure 6:
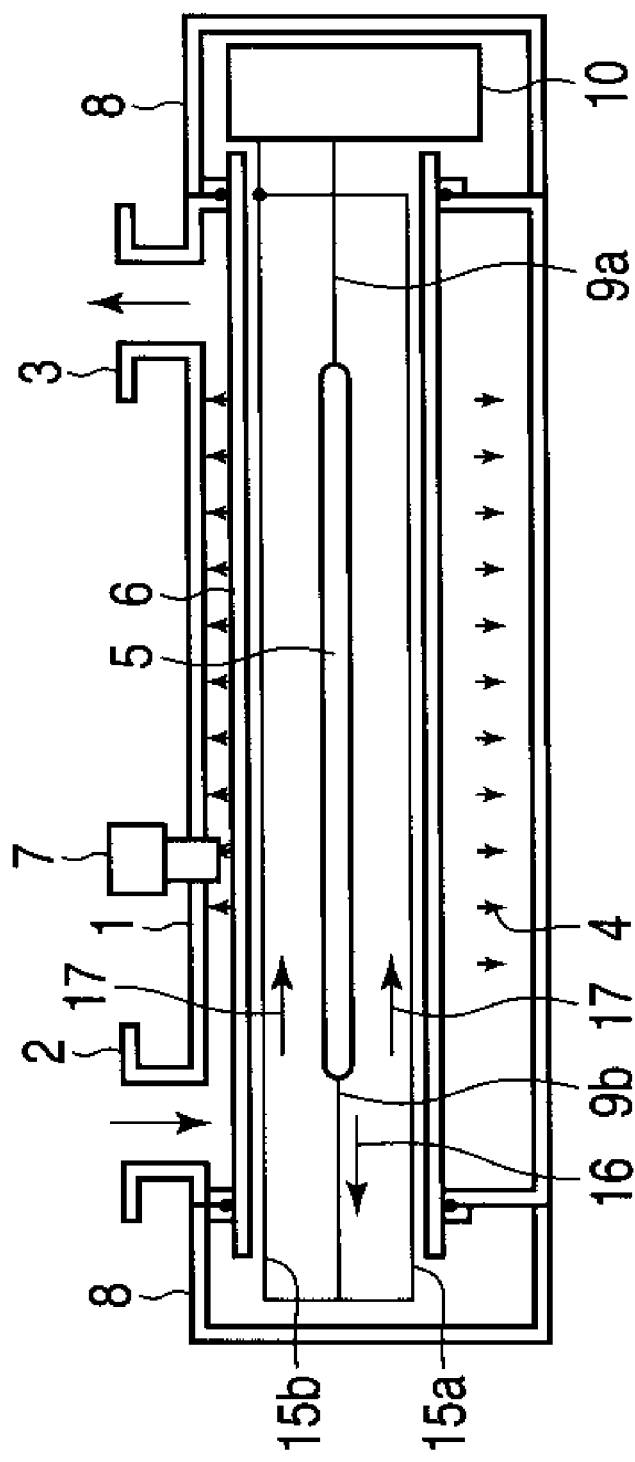
FIG. 6 is a sectional view of an ultraviolet irradiation apparatus according to an embodiment 3.

The ultraviolet irradiation apparatus according to the embodiment 3 will be described below with reference to FIG. 6. Note that portions same as those in FIG. 2 are denoted by the same reference numerals used in FIG. 2, and the description thereof will be omitted. As shown in FIG. 6, the ultraviolet irradiation apparatus according to the embodiment 3 has the protection pipe 6 with a larger diameter than that in FIG. 2. In addition, the second feeder wire 9b connected to a second terminal of the ultraviolet lamp 5 branches into feeder wires 15a and 15b at the second-terminal side of the ultraviolet lamp 5. At the first-terminal side of the ultraviolet lamp 5, a second end of the feeder wire 15a is connected to a second end of the feeder wire 15b. The feeder wires 9a, 9b, 15a, and 15b are all housed in the protection pipe 6 and the protection covers 8. The feeder wires 15a and 15b are placed line-symmetrically with respect to the ultraviolet lamp 5. Although not illustrated in the ultraviolet irradiation apparatus of FIG. 6, the feeder wires 15a and 15b are supported by one of the guide members and are fixed to the other one of the guide members, as in the case of the second feeder wire 9b shown in FIGS. 4 and 5.

According to the embodiment 3, each of the ultraviolet-irradiation water tank 1 and the protection covers 8 is made of a conductive material with a specific conductivity and a relative magnetic permittivity whose product is equal to or larger than 1. In addition, the thickness of each of the ultraviolet-irradiation water tank 1 and the protection covers 8 is at least three times as large as the skin depth at the frequency of the high-frequency current that flows through the ultraviolet lamp 5. Hence, like the ultraviolet irradiation apparatus according to the embodiment 1, the ultraviolet irradiation apparatus according to the embodiment 3 can prevent the electromagnetic waves in the vicinity of the ultraviolet lamp 5 and from the feeder wire 9 from leaking out of the ultraviolet irradiation apparatus, so that malfunctions of other apparatuses can be avoided.

According to the embodiment 3, the second feeder wire 9b connected to the second terminal of the ultraviolet lamp 5 branches into the feeder wires 15a and 15b. The feeder wires 15a and 15b thus branched out are placed line-symmetrically with respect to the ultraviolet lamp 5. Hence, the magnetic field generated by a high-frequency current 16 that flows through the first feeder wire 9a, the ultraviolet lamp 5, and the second feeder wire 9b cancels out the magnetic field generated by a high-frequency current 17 that flows through the branch feeder wires 15a and 15b. Accordingly, the synthetic magnetic field can be prevented from leaking out of the apparatus. As a consequence, according to the embodiment 3, malfunctions of other apparatuses can be avoided. Note that, in the embodiment 3, the case is described where the second feeder wire 9b branches into the two feeder wires 15a and 15b. The structure, however, is not limited to this. For example, the second feeder wire 9b may branch into an even-number, e.g., four, feeder wires, and a set of two branch feeder wires may be placed in a line-symmetrical position with respect to the ultraviolet lamp 5.

Note that in the embodiment 3, each of the feeder wire 9b, 15a, and 15b, all of which are in the vicinity of the ultraviolet lamp 5, is preferably made of aluminum or an aluminum alloy for the following reason. Specifically, when the oxygen contained in the air existing around the ultraviolet lamp 5 is reacted by the ultraviolet rays, ozone is generated. The ozone thus generated oxidizes the metal surfaces of the feeder wires to change conductivities of the metal surfaces of the feeder wires. As a consequence, the balance among the currents that flow through the plural branch feeder wires is disturbed. The magnetic field generated by the unbalanced currents that flow through the feeder wire 15a and 15b cannot cancel out the magnetic field generated by the current that flows through the second feeder wire 9b and the ultraviolet lamp 5. Aluminum and aluminum alloys are resistant to ozone and thus can prevent such problems from occurring.

Embodiment 4

Figure 7:
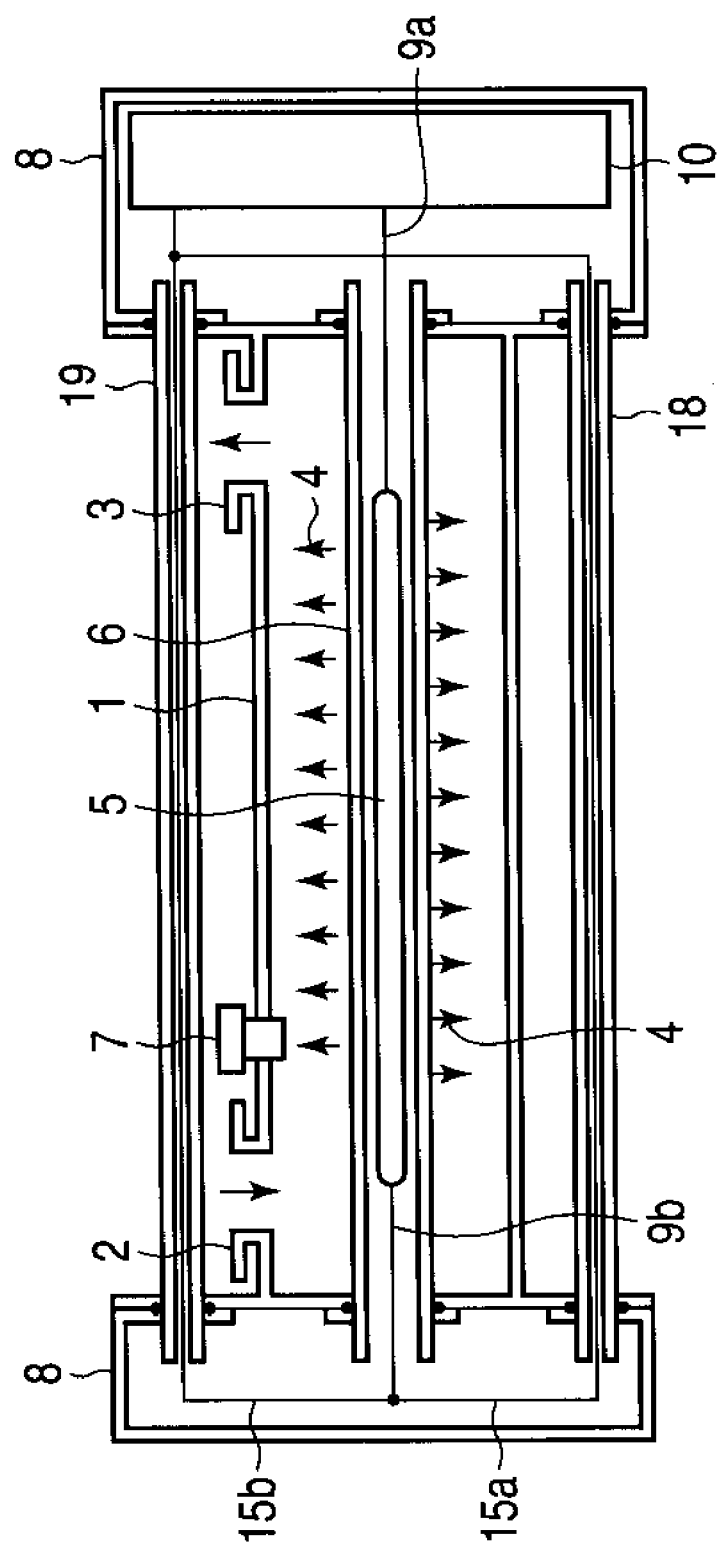
FIG. 7 is a sectional view of an ultraviolet irradiation apparatus according to an embodiment 4.

The ultraviolet irradiation apparatus according to the embodiment 4 will be described below with reference to FIG. 7. Note that portions same as those in FIG. 2 and FIG. 6 are denoted by the same reference numerals used in FIG. 2 and FIG. 6, and the description thereof will be omitted. Note that members 18 and 19 shown in FIG. 7 are feed-wire protection pipes provided outside of the ultraviolet-irradiation water tank 1. The pipes 18 and 19 are placed in parallel to the ultraviolet lamp 5. The end portions of each of the pipes 18 and 19 extend to reach the spaces formed by protection covers 8. Each of the pipes 18 and 19 is made of a conductive material with a specific conductivity and a relative magnetic permittivity whose product is equal to or larger than 1. In addition, the thickness of each of the pipes 18 and 19 is at least three times as large as the skin depth at the frequency of the high-frequency current that flows through the ultraviolet lamp 5. The feeder wire 15a that branches out from the feeder wire 9b passes through one of the protection covers 8 and the pipe 18, and is connected to a first terminal of the electronic ballast 10. The second feeder wire 15b that branches out from the feeder wire 9b passes through one of the protection covers 8 and the pipe 19, and is connected to the feeder wire 15a in the vicinity of the electronic ballast 10. Portions of these feeder wires 15a and 15b that are parallel to the ultraviolet lamp 5 are provided at line-symmetric positions with respect to the ultraviolet lamp 5.

According to the embodiment 4, similar effects obtained according to the embodiment 1 can be obtained. In the embodiment 4, the second feeder wire 9b branches into the two feeder wires 15a and 15b. The structure, however, is not limited to this. For example, the second feeder wire 9b may branch into an even-number, e.g., four, feeder wires, and a set of two branch feeder wires may be placed in a line-symmetrical position with respect to the ultraviolet lamp 5. In this case, plural pipes for feeder-wire protection are provided so as to correspond respectively to the branch feeder wires.

Embodiment 5

Figure 8:
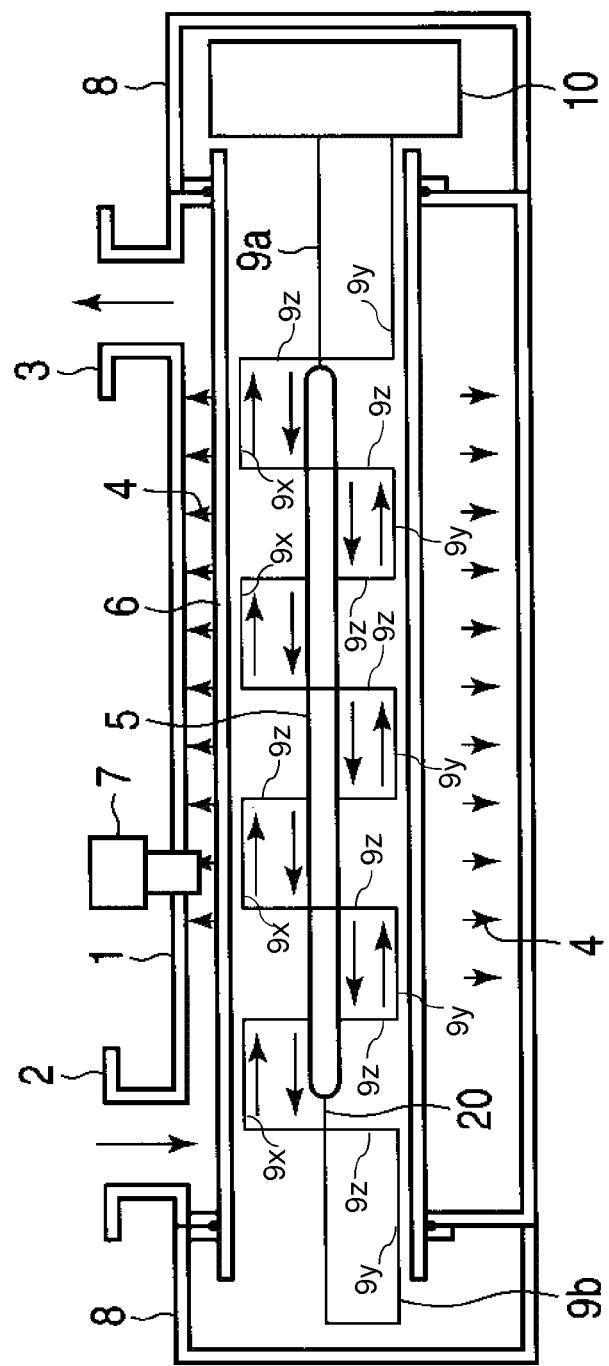
FIG. 8 is a sectional view of an ultraviolet irradiation apparatus according to an embodiment 5.

A ultraviolet irradiation apparatus according to the embodiment 5 will be described below with reference to FIG. 8. Note that portions same as those in FIG. 2 are denoted by the same reference numerals used in FIG. 2, and the description thereof will be omitted.

The ultraviolet irradiation apparatus according to the embodiment 5 has the second feeder wire 9b arranged in a spiral form around the ultraviolet lamp 5.

The structure of the second feeder wire 9b will be described in detail below. The second feeder wire 9b is divided into plural first sections 9x, plural second sections 9y, and plural third sections 9z. The first sections 9x and the second sections 9y are arranged on an imaginary first line and an imaginary second line, which are parallel to an ultraviolet lamp 5 and which are line-symmetrical to each other with respect to the ultraviolet lamp 5. To be more specific, the first sections 9x are on the first line whereas the second sections 9y are on the second line. The first sections 9x and the second sections 9y are placed alternately on their respective lines. Each of the third sections 9z is placed on a plane that is normal to the lengthwise direction of the ultraviolet lamp 5. The alternately arranged first sections 9x and second sections 9y are connected to one another by means of the third sections 9z. Thereby the plural first sections 9x, the plural second sections 9y, and the plural third sections 9z together form a continuous feeder wire. A first end of this continuous feeder wire is connected to a second terminal 20 of the ultraviolet lamp 5 whereas a second end of the continuous feeder wire is connected to a second terminal of the electronic ballast 10.

According to the embodiment 5, each of the ultraviolet-irradiation water tank 1 and the protection covers 8 is made of a conductive material with a specific conductivity and a relative magnetic permittivity whose product is equal to or larger than 1. In addition, the thickness of each of the ultraviolet-irradiation water tank 1 and the protection covers 8 is at least three times as large as the skin depth at the frequency of the high-frequency current that flows through the ultraviolet lamp 5. Accordingly, like the ultraviolet irradiation apparatus according to the embodiment 1, the ultraviolet irradiation apparatus according to the embodiment 5 can prevent the electromagnetic waves in the vicinity of the ultraviolet lamp 5 from leaking out of the ultraviolet irradiation apparatus, so that malfunctions of other apparatuses can be avoided.

In addition, according to the ultraviolet irradiation apparatus of the embodiment 5, the direction of the high-frequency current 20 that flows through the ultraviolet lamp 5 is opposite the direction of the high-frequency current that flows through the second feeder wire 9b in parallel to the ultraviolet lamp 5. Hence, the magnetic field generated by one of the two high-frequency currents mentioned above can cancel out the magnetic field generated by the other. Accordingly, the synthetic magnetic field can be prevented from leaking out of the ultraviolet-irradiation water tank 1. As a consequence, according to the fifth embodiment, malfunctions of other apparatuses can be avoided.

As has been described thus far, according to the ultraviolet irradiation apparatuses of the embodiments described above, each of the ultraviolet-irradiation water tank 1 and the protection covers 8 is made of a conductive material with a specific conductivity and a relative magnetic permittivity whose product is equal to or larger than 1. In addition, the thickness of each of the ultraviolet-irradiation water tank 1 and the protection covers 8 is at least three times as large as the skin depth at the frequency of the high-frequency current that flows through the ultraviolet lamp 5. Accordingly, the ultraviolet irradiation apparatuses of the embodiments described above can prevent the electromagnetic waves in the vicinity of the ultraviolet lamp 5 from leaking out of the ultraviolet irradiation apparatus, so that malfunctions of other apparatuses can be avoided.

Some embodiments of the invention have been described thus far. The embodiments are provided only as examples, and have no intention to restrict the scope of the invention. The novel embodiments can be carried out in various other forms. Various omissions, replacements, and modifications can be made within the gist of the invention. Such new embodiments and their modifications are included in both the scope of and the gist of the invention, and are also included in the invention described in the claims and their equivalents.

What is claimed is:

1. An ultraviolet irradiation apparatus comprising:
   an ultraviolet irradiation water tank having a water-inlet port for water to be treated and a water-outlet port for treated water;
   a protection pipe provided in the ultraviolet irradiation water tank, and penetrating two ends of the ultraviolet-irradiation water tank;
   an ultraviolet lamp provided in the protection pipe, and configured to emit ultraviolet rays onto the water to be treated by being lit up with high-frequency discharge at a frequency of 10 kHz to 10 MHz, inclusive;
   protection covers respectively provided on the two ends of the ultraviolet-irradiation water tank and configured to block the ultraviolet rays and electromagnetic waves;
   an electronic ballast provided in one of the protection covers; and
   a feeder wire provided in the ultraviolet-irradiation water tank and the protection covers and electrically connecting the ultraviolet lamp to the electronic ballast, wherein
   each of the ultraviolet-irradiation water tank and the protection covers is made of a conductive material with a specific conductivity and a relative magnetic permittivity whose product is equal to or larger than 1, and has a thickness at least three times as large as a skin depth at a frequency of a high-frequency current that flows through the ultraviolet lamp.

2. The ultraviolet irradiation apparatus according to claim 1 further comprising:
   a feeder-wire protection pipe provided in the ultraviolet-irradiation water tank, penetrating two ends of the ultraviolet-irradiation water tank, and arranged in parallel to the ultraviolet lamp, wherein
   the feeder wire includes a first feeder wire and a second feeder wire, the first feeder wire having a first end connected to a first terminal of the electronic ballast and a second end connected to a first terminal of the ultraviolet lamp, the second feeder wire having a first end connected to a second terminal of the ultraviolet lamp and a second end passing through the pipe and then connected to a second terminal of the electronic ballast, the second feeder wire is arranged in parallel to the ultraviolet lamp within the pipe, and the first feeder wire, the second feeder wire, the ultraviolet lamp, and the electronic ballast are connected to one another to form a loop.

3. The ultraviolet irradiation apparatus according to claim 1, wherein the feeder wire includes a first feeder wire and a second feeder wire both of which are provided in the protection pipe, the first feeder wire having a first end connected to a first terminal of the electronic ballast and a second end connected to a first terminal of the ultraviolet lamp, the second feeder wire having a first end connected to a second terminal of the ultraviolet lamp and a second end connected to a second terminal of the electronic ballast, and the first feeder wire, the second feeder wire, the ultraviolet lamp, and the electronic ballast are connected to one another to form a loop.

4. The ultraviolet irradiation apparatus according to claim 3 further comprising:

two guide members configured to fix respectively two ends of the ultraviolet lamp in the protection pipe; and a fixing member configured to fix the second feeder wire to one of the guide members located at the opposite side to the electronic ballast across the ultraviolet lamp, wherein the second feeder wire penetrates the two guide members, and is fixed to the one guide member by means of the fixing member while being supported by the other guide member.

5. The ultraviolet irradiation apparatus according to claim 1, wherein the feeder wire includes a first feeder wire and a second feeder wire both of which are provided in the protection pipe, the first feeder wire having a first end connected to a first terminal of the electronic ballast and a second end connected to a first terminal of the ultraviolet lamp, the second feeder wire having a first end connected to a second terminal of the ultraviolet lamp and a second end branching into an even-number of branch feeder wires connected to a second terminal of the electronic ballast, of the second feeder wire, an odd-numbered branch feeder wire is directly connected to the first terminal of the electronic ballast, and an even-numbered branch feeder wire is connected to the odd-numbered branch feeder wire in a vicinity of the electronic ballast, and the odd-numbered branch feeder wire and the even-numbered branch feeder wire are placed line-symmetrically to each other with respect to the ultraviolet lamp.

6. The ultraviolet irradiation apparatus according to claim 5, wherein the feeder wire is made of aluminum or an aluminum alloy.

7. The ultraviolet irradiation apparatus according to claim 1 further comprising:

an even number of feeder-wire protection pipes each penetrating two end portions of the ultraviolet-irradiation water tank and arranged in parallel to the ultraviolet lamp outside the ultraviolet-irradiation water tank, wherein each of the pipes is made of a conductive material with a specific conductivity and a relative magnetic permittivity whose product is equal to or larger than 1, and has a thickness at least three times as large as the skin depth at the frequency of the high-frequency current that flows through the ultraviolet lamp, the feeder wire includes a first feeder wire and a second feeder wire, the first feeder wire having a first end connected to a first terminal of the electronic ballast and a second end connected to a first terminal of the ultraviolet lamp, the second feeder wire having a first end connected to a second terminal of the ultraviolet lamp and a second end branching into an even-number of branch feeder wires an odd-numbered branch feeder wire of the second feeder wire passes through the protection pipe, one of the protection covers and the odd-numbered pipe, and is directly connected to a second terminal of the electronic ballast, an even-numbered branch feeder wire of the second feeder wire passes through the protection pipe, the one protection cover and the even-numbered pipe, and is connected to the odd-numbered branch feeder wire in a vicinity of the electronic ballast, the odd-numbered branch feeder wire and the even-numbered branch feeder wire are placed line-symmetrically to each other with respect to the ultraviolet lamp.

8. The ultraviolet irradiation apparatus according to claim 1, wherein the feeder wire includes a first feeder wire and a second feeder wire, both of which are provided in the protection pipe, the first feeder wire having a first end connected to a first terminal of the electronic ballast and a second end connected to a first terminal of the ultraviolet lamp, the second feeder wire arranged in a spiral form around the ultraviolet lamp, and having a first end connected to a second terminal of the ultraviolet lamp and a second end connected to a second terminal of the electronic ballast.

9. The ultraviolet irradiation apparatus according to claim 1, wherein the conductive material is any of a metal, a conductive resin, and a conductive ferrite.

10. The ultraviolet irradiation apparatus according to claim 1, wherein the conductive material is a stainless steel.

11. The ultraviolet irradiation apparatus according to claim 1, wherein the ultraviolet-irradiation water tank and the protection covers are made of a same material.

* * * * *